United States Patent [19]

Betensky

[11] 4,015,902

[45] Apr. 5, 1977

[54] ILLUMINATION SYSTEM FOR CONTINUOUS PATH ENLARGER

[75] Inventor: Ellis I. Betensky, Toronto, Canada

[73] Assignee: Fimacon Associates, Rochester, N.Y.

[22] Filed: Oct. 31, 1975

[21] Appl. No.: 627,779

[52] U.S. Cl. .................................... 355/60; 355/50; 355/77

[51] Int. Cl.² .................. G03B 27/32; G03B 27/48; G03B 27/52; G03B 27/70

[58] Field of Search .................. 355/50, 51, 45, 77, 355/70

[56] References Cited

UNITED STATES PATENTS

| | | | |
|---|---|---|---|
| 2,411,694 | 11/1946 | Place | 355/51 |
| 3,224,327 | 12/1965 | Schulze | 355/51 |
| 3,259,009 | 7/1966 | Walter | 355/50 |

FOREIGN PATENTS OR APPLICATIONS

| | | | |
|---|---|---|---|
| 573,643 | 3/1924 | France | 355/50 |

*Primary Examiner*—Donald A. Griffin
*Attorney, Agent, or Firm*—Schovee & Boston

[57] ABSTRACT

In a continuous path enlarger having an illumination system for illuminating a very wide continuously moving original and projecting the image thereof onto a much wider sheet of light sensitive recording material moving synchronously with the original, the improvement wherein the illumination system includes a plurality of identical abutting, illumination sources each having a light source and a lens system with the final lens thereof being in the shape of a parallelogram having straight side edges in contact with the adjacent side edges of each adjacent final lens, and with the side edges being at an acute angle to the direction of travel of the recording sheet. Further, the plurality of image areas on the recording sheet preferably overlap each other. Thus, the total amount of light received at any point on the recording sheet passing through an angled edge of one of the plurality of image areas integrates across the width of the exposure area and is sufficient to effect proper exposure of the recording material so that uniformity is achieved over the field of exposure.

34 Claims, 5 Drawing Figures

ILLUMINATION SYSTEM FOR CONTINUOUS PATH ENLARGER

BACKGROUND OF THE INVENTION

1. Field of the Invention

This invention relates to a continuous path enlarger and in particular to an illumination system therefor. 2. Description of the Prior Art The problem solved by the present invention is that of illuminating a very wide object (such as 17 inches wide) sufficiently to properly expose a much wider (such as 84 inches wide) light sensitive recording sheet in as short a time as possible with both the original and recording sheet moving synchronously with each other. The problem is complicated in the present instance by the fact that the recording material is preferably a diazo material that is relatively insenstive to light and also by the fact that its sensitivity is in the ultra violet region where it is difficult to get a large percentage of illumination or irradiance at the image plane since optical systems themselves absorb a considerable amount of ultra violet. The original moves past a large slit about 17 inches long and about 2 inches wide. Normally optical systems are rotationally symmetrical, so that a straight-forward solution to the problem would be a circular condenser lens 17 inches in diameter, however, to do this most of the light would be lost, plus the lenses would be extremely expensive since the cost thereof is proportional approximately to the cube of the diameter, and also the manufacture of the machine itself would be very complicated because the allowed tolerances would be very small because of the aperture and depth of the focus of a large aperture projection lens.

It is therefore an object of the present invention to provide an illumination system that solves the above-mentioned problems and in particular by providing a plurality of illumination sources each including a light source and a lens system, with the lens systems having a final element with straight edges at an angle to the direction of travel of the recording material. It is another object of the invention to provide such an illumination system wherein the individual image areas on the recording sheet overlap one another.

SUMMARY OF THE INVENTION

An illumination system for a continuous path enlarger having a synchronously moving wide original and much wider light sensitive recording sheet, including a plurality of identical illumination sources, each source including a light source and a lens system with a final lens having straight parallel side edges in contact with the straight side edges of each adjacent final lens and with the side edges being at an acute angle of approximately 10° to the direction of travel of the recording sheet. Also, the edges of the image areas on the recording sheet preferably overlap each other.

BRIEF DESCRIPTION OF THE DRAWINGS

The present invention will be more fully understood by reference to the following detailed description thereof, when read in conjunction with the attached draing, wherein like reference numerals refer to like elements and wherein.

DETAILED DESCRIPTION OF THE PREFERRED EMBODIMENT

Figure 1:
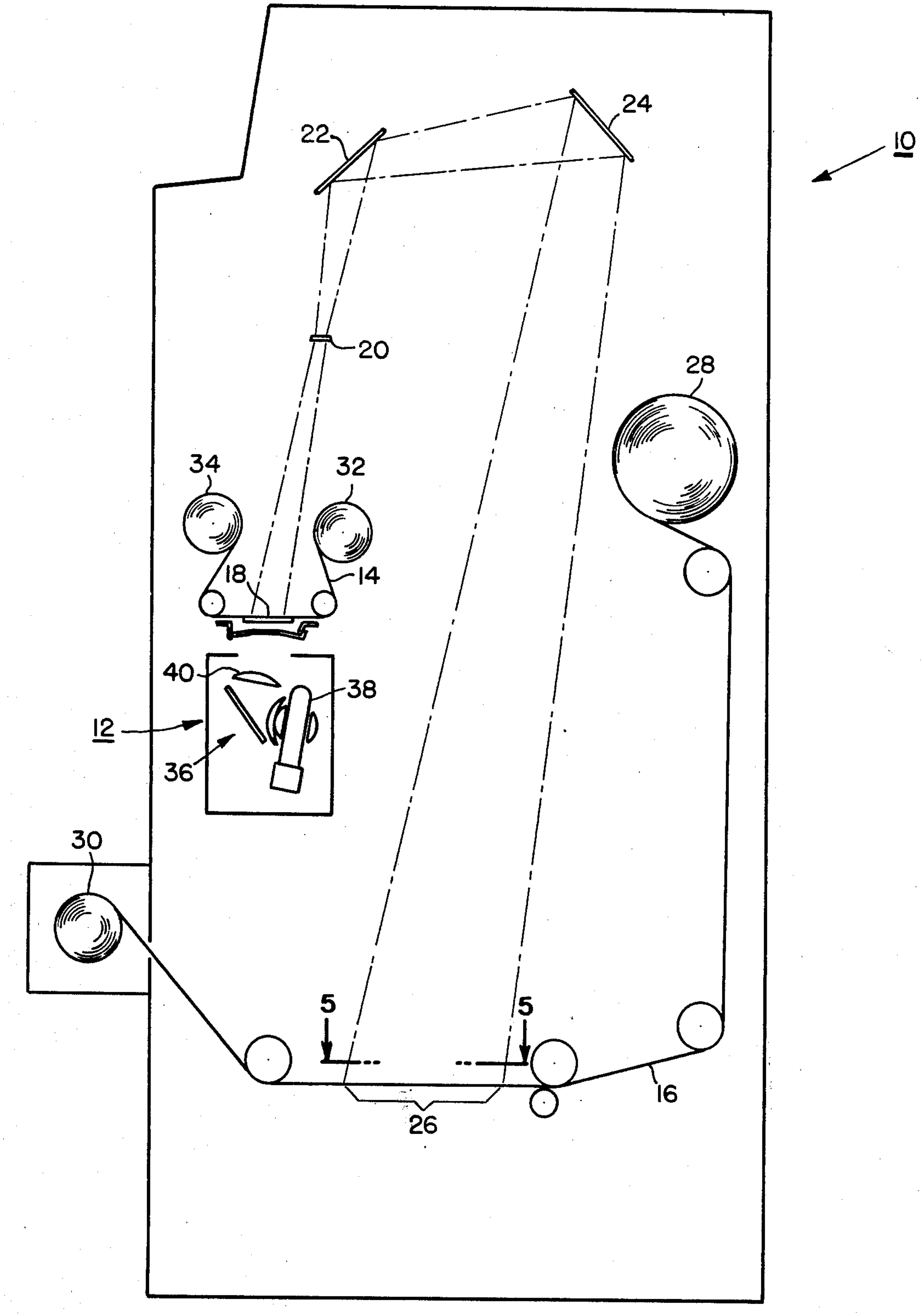
FIG. 1 is a partly schematic, partly diagrammatic side view through a continuous path enlarger having an illumination system according to the present invention.

With reference now to the drawings, FIG. 1 shows a continuous path enlarger 10 having an illumination system 12 in accordance with the present invention for illuminating a continuous strip original 14 with sufficient amount of light to properly expose a continuous strip light sensitive recording sheet 16 moving synchronously with the original 14. The recording sheet 16 in the preferred embodiment is a relatively insensitive diazo material requiring a substantial amount of illumination in the ultra violet region. The original 14 is moved (by a motor not shown) past an exposure slot 18 which in the preferred embodiment is approximately 17 inches long and 2 inches wide. The light from the illumination system 12 passes through the slot 18, to an enlarging lens 20, to first and second mirrors 22 and 24 and thence to an exposure area 26 on the recording sheet 16, which sheet in the preferred embodiment has a width of approximately 84 inches. The recording sheet 16 is moved (by a motor not shown) from a supply roll 28 through the exposure area 26 to a take up roll 30.

Figure 2:
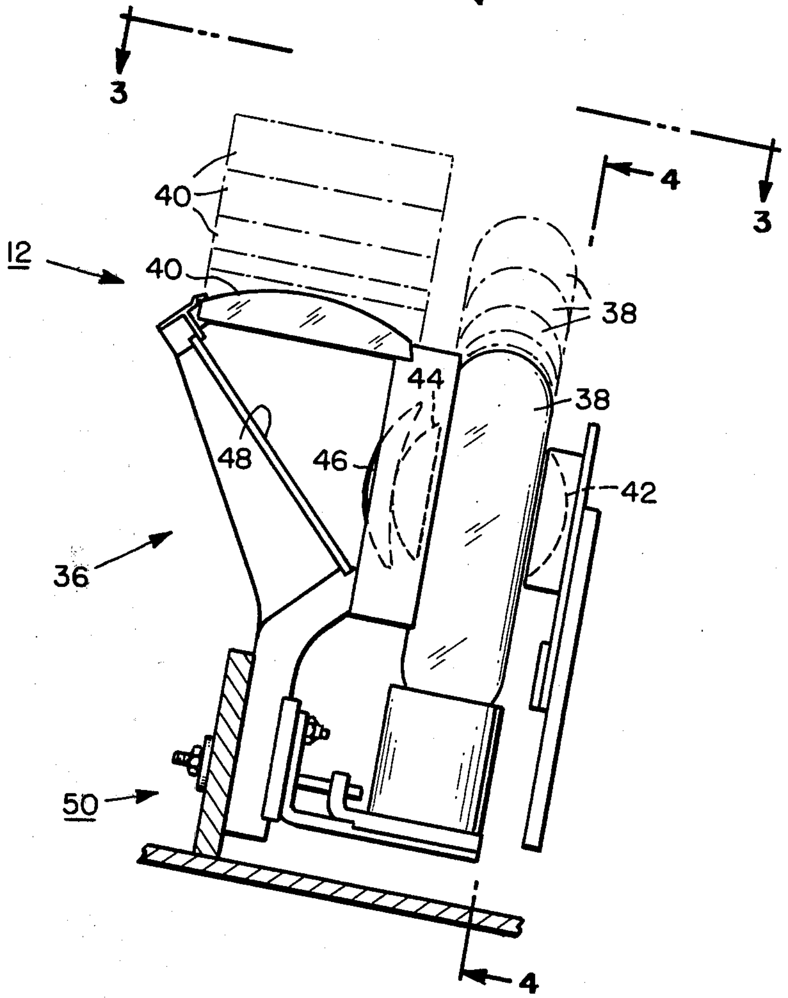
FIG. 2 is a side view of the illumination system of the present invention showing in particular one illumination source thereof.

The illumination system 12 includes a plurality of identical illumination sources 36. FIG. 2 is an enlarged view of the illumination system 12 showing the details of the identical illumination sources 36 including a light source 38, and a lens system including a final lens 40. The lens system includes a reflector 42, a pair of lenses 44 and 46, a mirror 48 and the final lens 40. Each illumination source 36 also includes adjusting means 50 for the light source 38. FIG. 2 shows a plurality of additional final lenses 40 and light sources 38 of some of the adjacent illumination sources.

Figure 3:
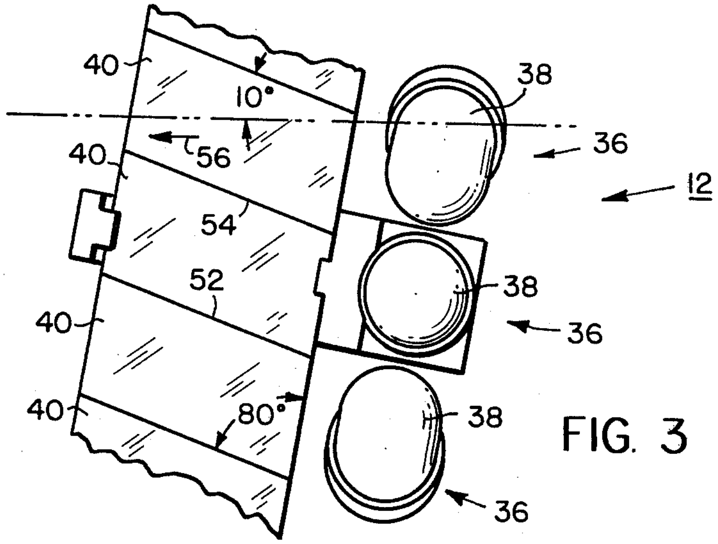
FIG. 3 is a partial top view of the illumination system of the present invention along lines 3—3 of FIG. 2.

FIG. 3 is a partial view from the top of the illumination system 12 showing a plurality of identical and adjacent illumination sources 36 and in particular a plurality of light sources 38 and abutting or contacting final lenses 40. As is seen in FIG. 3, the final lenses 40 (or their edges or peripheries) are formed as parallelograms and that the side edges 52 and 54 of each final lens 40 is at an angle to the direction of travel of the original and of the recording sheet as indicated by the arrow 56 and accompanying dotted line showing such direction of travel relative to the orientation of the final lenses 40. The acute included angle in the parallelogram of the final lenses 40 is approximately 80° and the acute angle which the side edges 42 and 54 of each final lens 40 makes with the direction of travel 56 is approximately 10°.

Figure 4:
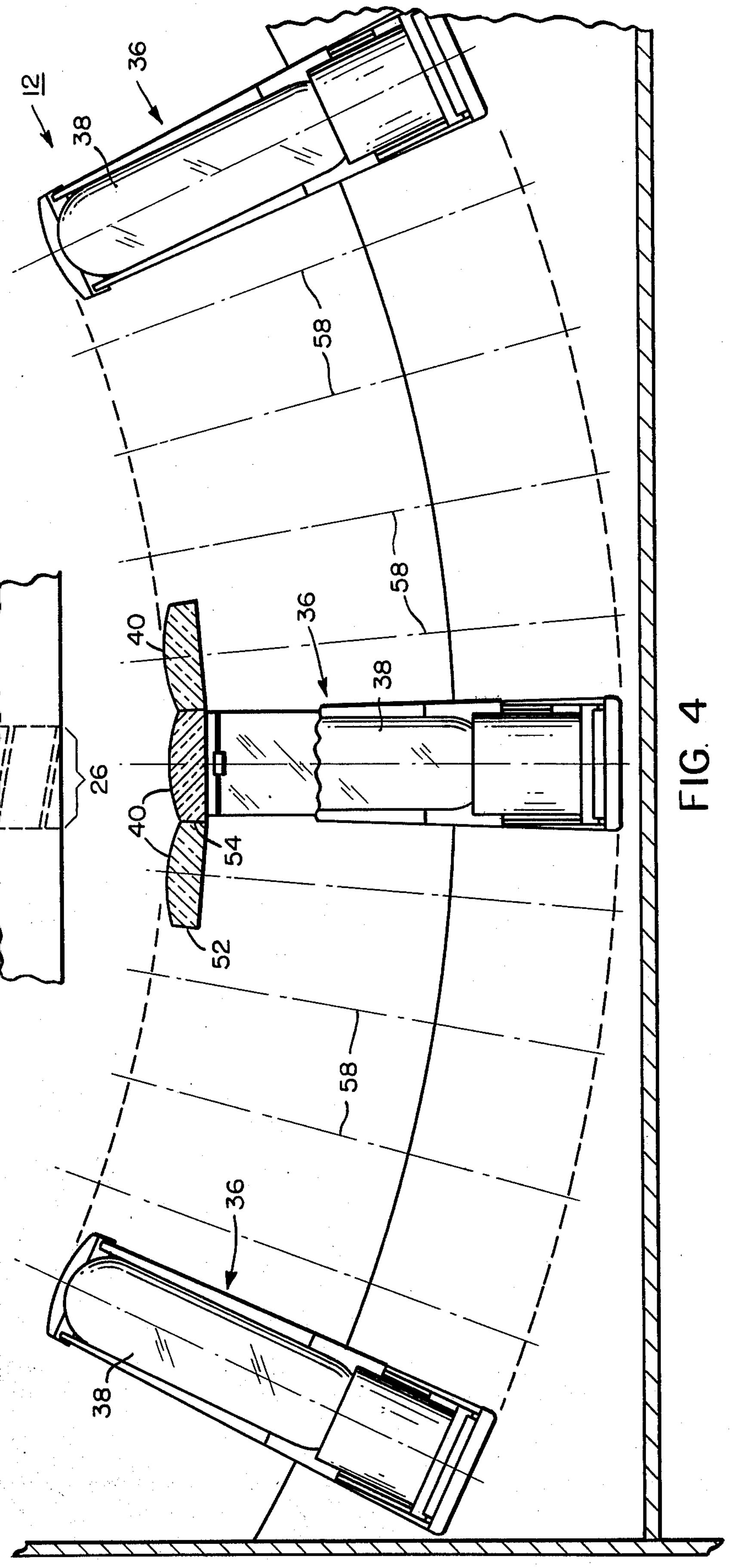
FIG. 4 is a partly diagrammatic, partly cross-sectional rear view of the illumination system of FIG. 2 taken along the lines 4—4 thereof.

FIG. 4 is a rear view along line 4—4 of FIG. 2 of the illumination system 12 showing a plurality of the illumination sources 36. All of the illumination sources are not shown, but their positions are indicated by the center lines 58. Each of the illumination systems 36 is arranged such that the side edges 52 and 54 of each final lens 40 is in contact with the adjacent edges 52 and 54 of each adjacent lens 40. The individual illumination sources 36 are arranged on an arc such that the optical axis of each final lens 40 directs the light rays into the enlarging lens 20 shown in FIG. 1.

Figure 5:
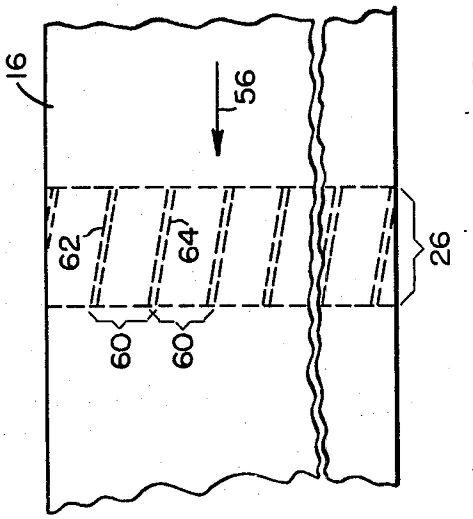
FIG. 5 is a top view showing the overlapping individual image areas in the expsoure area on the recording sheet.

Referring to FIG. 5, which is a top view of the recording sheet 16 at the exposure area 26 thereof, it will be seen that edges 62 and 64 of each exposure area 60 overlap the adjacent edges of the adjacent exposure areas 60.

According to the present invention, no unexposed lines are formed on the recording sheet 16 in the areas between adjacent exposure areas 60 corresponding to the abutting edges of adjacent lenses 40 because the abutting side edges 52 and 54 of adjacent final lenses 40 are placed at an acute angle to the direction of travel of the recording sheet 16 and because the images on the recording sheet 16 are formed such that the adjacent edges overlap. No single point on the moving recording sheet 16 remains at such edge areas but rather quickly passes through such edge areas and the light received on each such point on sheet 16 therefore integrates in its passage across the width of the exposure area 26 such that the total light received is sufficient to expose the sheet 16.

The invention has been described in detail with particular reference to the preferred embodiments thereof, but it will be understood that variations and modifications can be effected within the spirit and scope of the invention as described hereinabove and as defined in the appended claims. For example, the lenses need not be in contact and the last element of the lens system can be a mask rather than a lens.

I claim:

1. Apparatus for illuminating an original for projecting an image thereof onto a recording sheet moving synchronously with the original comprising:
   a. an illumination system including a plurality of separate illumination sources, each arranged for illuminating a portion of the width of an original; and
   b. each of said illumination sources including a light source and a lens system, each lens system including a final element having side edges at an acute angle to the direction of travel of said sheet through an exposure area therefor.

2. The apparatus according to claim 1 wherein said acute angle is approximately 10°.

3. The apparatus according to claim 1 wherein each of said illumination sources focuses an image on a recording sheet such that the edges of each image overlap the adjacent edges of each adjacent image.

4. The apparatus according to claim 1 including a single enlarging lens and wherein each of said illumination sources is positioned on an arc for directing light through said single enlarging lens, 5. The apparatus according to claim 1 wherein each of said final elements is a final lens.

6. The apparatus according to claim 5 wherein each of said final lenses abuts each each adjacent final lens.

7. The apparatus according to claim 6 wherein each of said final lenses has straight side edges in contact along their entire length with the adjacent side edges of each adjacent final lens.

8. The apparatus according to claim 7 wherein the periphery of each final lens is a parallelogram 9. The apparatus according to claim 8 wherein the acute included angle is bout 80 .

10. The apparatus according to claim 9 wherein said acute angle is approximately 10°.

11. The apparatus according to claim 10 wherein each of said illumination sources focuses an image on a recording sheet such that the edges of each image overlap the adjacent edges of each adjacent image.

12. The apparatus according to claim 11 including a single enlarging lens and wherein each of said illumination sources is positioned on an arc for directing light through said single enlarging lens.

13. The apparatus according to claim 7 wherein said two side edges are parallel to each other.

14. The apparatus according to claim 13 wherein said acute angle is approximately 10°.

15. The apparatus according to claim 14 wherein each of said illumination sources focuses an image on a recording sheet such that the edges of each image overlap the adjacent edges of each adjacent image.

16. The apparatus according to claim 7 wherein each of said illumination systems is identical to each other.

17. The apparatus according to claim 16 including an elongated exposure slot and means for moving an original past said slot, a light sensitive recording sheet, means for moving said sheet past said exposure area, and means for projecting an illuminated original in said slot onto said sheet in said exposure area.

18. The apparatus according to claim 17 wherein said acute angle is approximately 10°.

19. The apparatus according to claim 18 wherein the edges of each of said final lenses forms a parallelogram with the long sides thereof being said side edges.

20. The apparatus according to claim 19 wherein said light source is a mercury arc light source and each of said lenses systems includes a reflector on one side of said mercury arc, a pair of lenses on the opposite side of said mercury arc, and a mirror for reflecting light from said mercury arc after passing through said pair of lenses in a substantially perpendicular direction through said final lens, the optical axis of which is approximately perpendicular to the optical axis of said pair of lenses.

21. The apparatus according to claim 20 wherein each of said illumination sources focuses an image on said sheet such that the edges of each image overlap the adjacent edges of each adjacent image on said sheet.

22. The apparatus according to claim 6 wherein said acute angle is approximately 10°.

23. The apparatus according to claim 5 wherein said acute angle is approximately 10°.

24. The apparatus according to claim 1 wherein said side edges are each a single straight edge.

25. The apparatus according to claim 24 wherein said acute angle is approximately 10°.

26. The apparatus according to claim 1 wherein said acute angle is sufficiently large so that any given point on a recording sheet as it travels past an exposure area receives a sufficient amount of light from areas spaced apart from said side edges such that the total integrated amount of light received at said point is sufficient for proper exposure of said point.

27. A method for illuminating a wide original such that an image thereof can be projected onto an even wider recording sheet comprising:
   a. providing an illumination system including a plurality of illumination sources each including a light source and a lens system having a final element with straight side edges and b. orienting said final element of each source with its said side edges at an acute angle to the direction of travel of a recording sheet through an exposure area, whereby the total amount of light received by every point on a recording sheet that travels past an edge of an image, integrated over the width of the exposure area is sufficient for proper exposure of said point.

28. The method according to claim 27 wherein said orienting comprises positioning said edges at approximately 10° to said direction of travel.

29. The method according to claim 28 including focusing said original on said sheet such that the edges of each image area overlap the edges of each adjacent image area.

30. The method according to claim 27 wherein said final element is a lens having parallel straight side edges and including abutting said edges with each adjacent side edge of each adjacent final lens.

31. The method according to claim 30 including projecting an image of an illuminated original onto a recording sheet and moving an original and a recording sheet synchronously with each other.

32. The method according to claim 31 including focusing said original on said sheet such that the edges of each image area overlap the edges of each adjacent image area.

33. The method according to claim 31 including positioning said illumination sources in an arc with an enlarging lens at the center thereof.

34. The method according to claim 27 including moving an original and a recording sheet synchronously with each other in the same selected direction of travel through an exposure slot and an exposure area, respectively.

* * * * *

UNITED STATES PATENT AND TRADEMARK OFFICE

CERTIFICATE OF CORRECTION

PATENT NO. : 4,015,902

DATED : April 5, 1977

INVENTOR(S) : Ellis I. Betensky

It is certified that error appears in the above-identified patent and that said Letters Patent are hereby corrected as shown below:

Claim 9, line 2, delete "bout 80 ." and insert therefor --about 80°.--

Claim 20, line 3, delete "lenses" and insert therefor --lens--

Signed and Sealed this

*ninth* Day of *August 1977*

[SEAL]

*Attest:*

RUTH C. MASON
*Attesting Officer*

C. MARSHALL DANN
*Commissioner of Patents and Trademarks*